US008695956B2

(12) United States Patent
Hamano et al.

(10) Patent No.: US 8,695,956 B2
(45) Date of Patent: Apr. 15, 2014

(54) COMPRESSION COIL SPRING AND MANUFACTURING DEVICE AND MANUFACTURING METHOD FOR COIL SPRING

(75) Inventors: Toshio Hamano, Yokohama (JP); Hideki Okada, Yokohama (JP); Kenji Yamamotoya, Yokohama (JP)

(73) Assignee: NHK Spring Co., Ltd., Tokyo (JP)

( * ) Notice: Subject to any disclaimer, the term of this patent is extended or adjusted under 35 U.S.C. 154(b) by 212 days.

(21) Appl. No.: 13/244,529

(22) Filed: Sep. 25, 2011

(65) Prior Publication Data

US 2012/0013059 A1    Jan. 19, 2012

Related U.S. Application Data

(63) Continuation of application No. PCT/JP2010/054688, filed on Mar. 18, 2010.

(30) Foreign Application Priority Data

Apr. 3, 2009  (JP) ................................ 2009-091191

(51) Int. Cl.
*F16F 1/06*    (2006.01)

(52) U.S. Cl.
USPC ........................................................ 267/167

(58) Field of Classification Search
CPC .............. F16F 1/02; F16F 1/04; F16F 1/041; F16F 1/042; F16F 2226/02; F16F 2228/08; F16F 2228/10
USPC ............. 267/166, 166.1, 167; 29/90.7, 896.9, 29/896.91, 896.93; 72/53
See application file for complete search history.

(56) References Cited

U.S. PATENT DOCUMENTS

| 361,298 A | 4/1887 | Kilmer |
| 5,955,171 A | 9/1999 | Lujan |

(Continued)

FOREIGN PATENT DOCUMENTS

| CN | 1354802 A | 6/2002 |
| JP | 61-20641 A | 1/1986 |

(Continued)

OTHER PUBLICATIONS

International Preliminary Report on Patentability (IPRP) dated Nov. 24, 2011 (in English) in counterpart International Application No. PCT/JP2010/054688.

(Continued)

*Primary Examiner* — Thomas J Williams
(74) *Attorney, Agent, or Firm* — Holtz, Holtz, Goodman and Chick, PC (57) ABSTRACT

Bending deformation exceeding a yield stress is applied by winding a material on a mandrel. Coiling is performed simultaneously with the application of the bending deformation, and the load is removed after the coiling. This spring includes an outside surface region having a compressive residual stress and a compressive stress reduction region in which the compressive residual stress is reduced from the outside surface region toward the center of the material. A stress change portion at which a change from the compressive residual stress to a tensile residual stress occurs exists between the outside surface region and the center of the material. The spring further includes a tensile stress peak portion, tensile stress reduction region, and inside surface region. The inside surface region has the tensile compressive residual stress having an absolute value smaller than that of the outside surface region.

1 Claim, 5 Drawing Sheets

(56) References Cited

U.S. PATENT DOCUMENTS

| | | | |
|---|---|---|---|
| 6,193,816 B1 * | 2/2001 | Nakano et al. | 148/333 |
| 6,346,157 B1 * | 2/2002 | Takezawa et al. | 72/53 |
| 6,544,360 B1 * | 4/2003 | Tange et al. | 29/90.7 |
| 8,069,881 B1 * | 12/2011 | Cunha et al. | 140/89 |
| 8,308,150 B2 * | 11/2012 | Tange et al. | 267/166 |
| 2006/0060269 A1 * | 3/2006 | Nakano et al. | 148/580 |
| 2009/0283173 A1 | 11/2009 | Eto | |

FOREIGN PATENT DOCUMENTS

| | | |
|---|---|---|
| JP | 62-142442 U | 9/1987 |
| JP | 6-158158 A | 6/1994 |
| JP | 2001-82518 A | 3/2001 |
| WO | WO 00/49186 A1 | 8/2000 |
| WO | WO 2007/138989 A1 | 12/2007 |

OTHER PUBLICATIONS

Chinese Office Action dated Mar. 14, 2013 (and English translation thereof) in counterpart Chinese Application No. 201080015894.1.

International Search Report dated May 18, 2010 (in English) in counterpart International Application No. PCT/JP2010/054688.

* cited by examiner

COMPRESSION COIL SPRING AND MANUFACTURING DEVICE AND MANUFACTURING METHOD FOR COIL SPRING

CROSS REFERENCE TO RELATED APPLICATIONS

This application is a Continuation Application of PCT Application No. PCT/JP2010/054688, filed Mar. 18, 2010 and based upon and claiming the benefit of priority from prior Japanese Patent Application No. 2009-091191, filed Apr. 3, 2009, the entire contents of all of which are incorporated herein by reference.

BACKGROUND OF THE INVENTION

1. Field of the Invention

This invention relates to a compression coil spring used as, for example, a vehicle suspension spring or the like and a manufacturing device and manufacturing method for a coil spring.

2. Description of the Related Art

Manufacturing devices that manufacture coil springs by hot or cold forming of materials are known as coil spring manufacturing devices. A hot coiling device is disclosed in Jpn. Pat. Appln. KOKAI Publication No. 61-20641 (Patent Document 1). This coiling device comprises a mandrel on which a heated material is wound and a guide mechanism that guides the material such that the material is wound at a predetermined pitch. The distal end portion of the material is chucked by a clamping mechanism attached to the mandrel. Those parts of the material (not having been wound on the mandrel yet) other than the distal end portion are in a free state without restraint. The material is spirally formed by being wound on the mandrel. The formed coil spring is subjected to heat treatment, such as quenching, tempering, etc. Compressive residual stress is produced on the surface of the spring by shot peening after the heat treatment.

In order to manufacture a coil spring with a relatively small diameter, a coiling device is used such that a material is wound cold on a mandrel. In the cold-formed coil spring, compressive residual stress is caused on the outside of a bend of the spring by spring-back, and tensile residual stress is caused on the inside of the bend of the spring. Tensile residual stress adversely affects the durability of the coil spring. If necessary, therefore, the tensile residual stress on the surface inside the bend is reduced or compressive residual stress is produced on the surface by stress relieving annealing or shot peening.

It is important for a coil spring used as a vehicle suspension spring to have reduced weight and improved durability to overcome higher-stress application. The durability of a compression coil spring, which is designed to repeat elastic deformation, is considerably influenced by stress produced during the deformation. It is known, in particular, that the lower the tensile stress on the surface of the spring, the more the durability of the spring is improved. Accordingly, such a method is adopted that the durability of the spring is improved by previously applying compressive residual stress to the surface of the spring. A typical example of this method is shot peening.

However, this conventional method requires equipment and a process for shot peening independent of coiling (plastic working). This results in an increase in product costs. It is not easy, moreover, to produce sufficient compressive residual stress on the inner surface side of the coil spring by shot peening. If possible, therefore, shot peening is expected to be omitted.

The inventors hereof proposed to control the residual stress distribution after working for a preferred level by intentionally applying loads, such as tensile and torsional loads, as well as necessary loads for original plastic working (coiling) during a cold plastic working for the spring. The special point is to confine the tensile residual stress that adversely affects the durability performance of the spring within the region from the surface of the spring to the interior of the spring.

BRIEF SUMMARY OF THE INVENTION

The object of the present invention is to provide a compression coil spring having preferable residual stress for the improvement of durability performance and a coil spring manufacturing device and manufacturing method.

The present invention is a compression coil spring, which is formed by spirally bending a rod-shaped spring material and comprises an outside surface region, compressive stress reduction region, stress change portion, tensile stress peak portion, tensile stress reduction region, and inside surface region. The outside surface region comprises a surface on the outside of a bend of the coil spring and has a compressive residual stress. In the compressive stress reduction region, the compressive residual stress is reduced from the outside surface region toward the center of the material. The stress change portion exists between the outside surface region and the center of the material and involves a change from the compressive residual stress to a tensile residual stress. The tensile stress peak portion exists between the stress change portion and the center of the material and involves a maximum tensile residual stress. In the tensile stress reduction region, the tensile residual stress is reduced from the tensile stress peak portion toward the inside of the bend of the coil spring. The inside surface region comprises a surface on the inside of the bend and has a tensile residual stress or a compressive residual stress with an absolute value smaller than that of the compressive residual stress of the outside surface region.

A manufacturing device for a coil spring of the present invention comprises a mandrel, material fixing mechanism, mandrel drive mechanism, stressing mechanism, movement mechanism, and controller. The mandrel has an outer peripheral surface corresponding to the coil spring to be formed. The material fixing mechanism secures a distal end portion of a rod-shaped spring material to the mandrel. The mandrel drive mechanism rotates the mandrel in a fixed direction, thereby spirally winding the material on the mandrel and producing bending deformation exceeding a yield stress. The stressing mechanism applies a tensile and/or torsional load to the material wound on the mandrel simultaneously with the bending deformation. The movement mechanism relatively moves the stressing mechanism along an axis of the mandrel in association with rotation of the mandrel. The controller controls the tensile or torsional load applied by the stressing mechanism, based on previously input data.

Further, a manufacturing method for a coil spring of the present invention comprises a bending process, stressing process, and unloading process. In the bending process, bending deformation exceeding a yield stress is produced by spirally winding a rod-shaped spring material on a mandrel at a temperature not higher than the cold-forming or $A_1$-transformation (or pearlite transformation) temperature. In the stressing process, a tensile and/or torsional load is applied to the material simultaneously with the bending deformation. In the unloading process, a compressive residual stress is left on a surface of the material on the outside of a bend by removing the load, in such a manner that the material is disengaged from the mandrel after the stress is applied to the material, and a tensile residual stress or a compressive residual stress, which has an absolute value smaller than that of the compressive residual stress on the outside of the bend, is produced on a surface of the material on the inside of the bend. If necessary, the coil spring may be shot-peened after the unloading process.

EFFECT OF THE INVENTION

According to the present invention, the tensile residual stress or compressive residual stress, the absolute value of which is smaller than that of the compressive residual stress on the outside of the bend, can be produced on the inside of the bend as the coil spring is plastically worked (or coiled). Thus, the durability of the compression coil spring can be improved. According to the present invention, shot peening can be reduced or omitted, so that simplification of manufacturing processes and manufacturing equipment for the coil spring, reduction of the manufacturing cost, etc., can be achieved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A coil spring manufacturing device according to one embodiment of the present invention will now be described with reference to FIG. 1.

Figure 1:
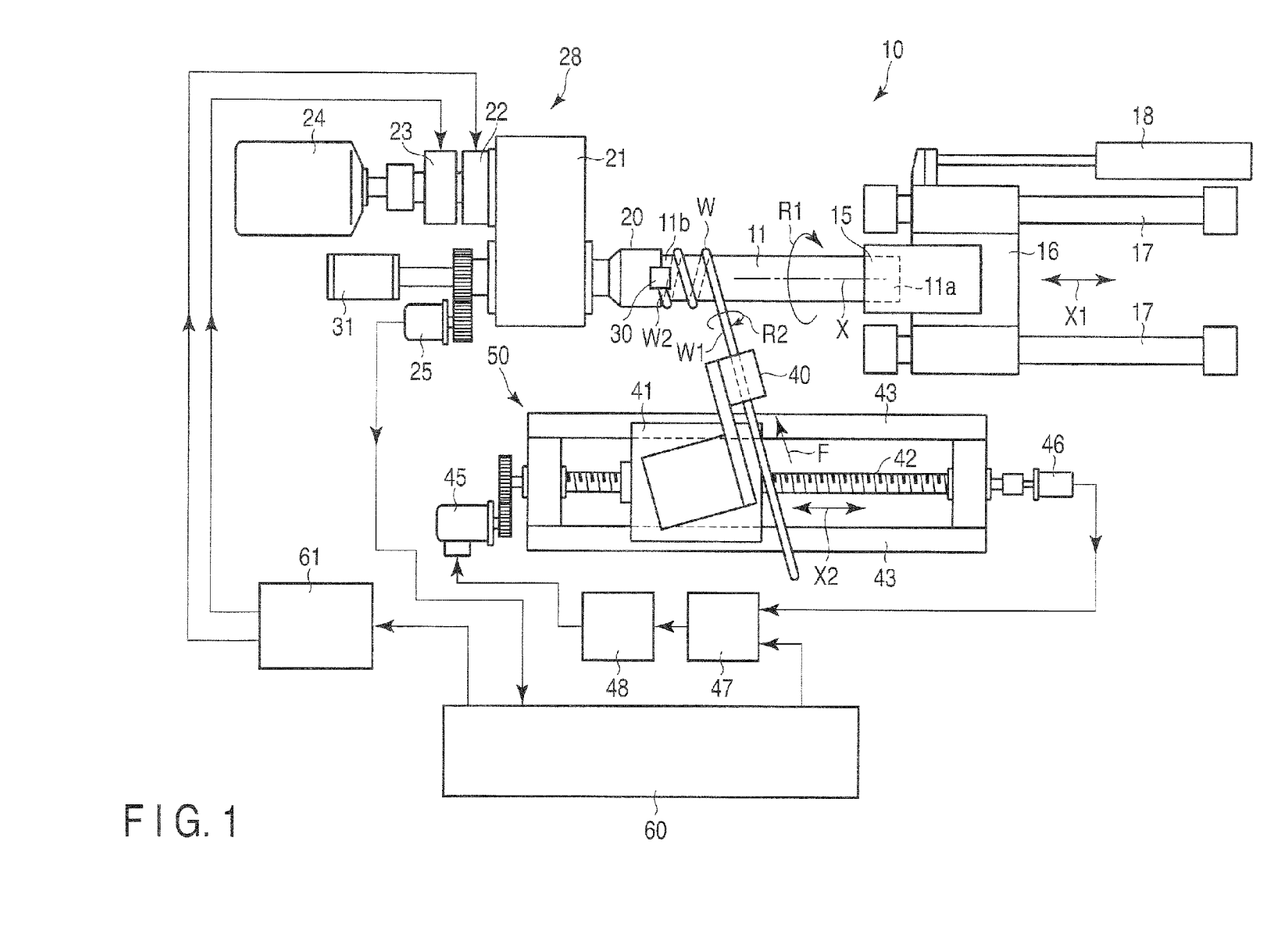
FIG. 1 is a plan view of a coil spring manufacturing device according to one embodiment of this invention.

A coil spring manufacturing device 10 shown in FIG. 1 comprises a mandrel 11 for coiling a compression coil spring W at a temperature (cold or warm) not higher than the $A_1$-transformation temperature. While an example of the mandrel 11 is columnar, it may be of another shape, such as conical. A material W1 of the compression coil spring W is spirally wound on the mandrel 11. The material (spring material) W1 consists mainly of spring steel and is rod-shaped. The cross-section of the material W1 may be perfectly circular or of a shape combining a plurality of circular arcs, such as an ellipse or oval.

One end portion 11a of the mandrel 11 is rotatably supported by a mandrel holder 15. The mandrel holder 15 is mounted on a movable base 16. The movable base 16 is movable along guides 17 in the direction indicated by arrow X1 in FIG. 1. The mandrel holder 15 and movable base 16 are reciprocated in the direction of arrow X1 by a cylinder mechanism 18.

The other end portion 11b of the mandrel 11 is removably held by a mandrel driver head 20. The mandrel driver head 20 is rotated by a motor 24 through a reduction gear mechanism 21, brake 22, clutch 23, etc. The mandrel 11 rotates in the direction indicated by arrow R1 in FIG. 1. The reduction gear mechanism 21 comprises a first detector 25 for detecting the rotational angle of the mandrel driver head 20. The reduction gear mechanism 21, brake 22, clutch 23, motor 24, etc., constitute a mandrel drive mechanism 28 for rotating the mandrel 11.

The mandrel driver head 20 comprises a chuck 30 that functions as a material fixing mechanism. The chuck 30 is moved radially relative to the mandrel 11 by a cylinder mechanism 31. A distal end portion W2 of the material W1 is fixed by the chuck 30. If the mandrel 11 is rotated in the direction of arrow R1 (FIG. 1) by the mandrel drive mechanism 28, the material W1 is spirally wound on the mandrel 11. Thus, the material W1 moves in the direction indicated by arrow F toward the mandrel 11 as it rotates in the direction indicated by arrow R2 about its own axis.

A stressing mechanism 40 is disposed beside the mandrel 11. The stressing mechanism 40 is configured to be capable of applying a tensile or torsional load to the material W1 wound on the mandrel 11.

For example, the stressing mechanism 40 comprises a torque generating mechanism, brake mechanism, etc. The torque generating mechanism applies a torsional load to the material W1 by restraining the material W1 from rotating in the direction of arrow R2. The brake mechanism applies a tensile load to the material W1 by braking and preventing the material W1 from moving in the direction of arrow F. The stressing mechanism 40 may incorporate a torque generating mechanism configured to positively twist the material W1 and tension mechanism configured to positively pull the material W1.

The stressing mechanism 40 is mounted on a movable table 41. When a feed screw 42 rotates, the movable table 41 reciprocates along an axis X of the mandrel 11 (or in the direction indicated by arrow X2 in FIG. 1) along a guide 43. The feed screw 42 is rotated by a servomotor 45 as an example of an actuator. While an example of the servomotor 45 is a DC servomotor, an AC servomotor, pulse motor, hydraulic servomotor, etc., may be used instead.

The rotational angle of the feed screw 42 is detected by a second detector 46. Based on the rotational angle detected by the second detector 46, the position of the movable table 41 is input to a counter 47. A signal input to the counter 47 is fed back to the servomotor 45 through a servo amplifier 48. A movement mechanism 50 moves the stressing mechanism 40 along the axis X of the mandrel 11. The movement mechanism 50 comprises the feed screw 42 and servomotor 45.

A controller 60 is used to control the mandrel drive mechanism 28, servomotor 45, and stressing mechanism 40. The controller 60 is formed of a data processor such as a computer that functions as control means. The controller 60 is supplied with a signal from the first detector 25, that is, a signal on the rotational angle of the mandrel driver head 20. Data on the coil spring W are previously input to the controller 60. The position (in the direction of arrow X2) of the stressing mechanism 40 is controlled as the mandrel drive mechanism 28 and servomotor 45 are controlled based on these data, rotational angle of the mandrel driver head 20, etc. A clutch/brake drive unit 61 is connected to the controller 60. The clutch/brake drive unit 61 activates the brake 22 and clutch 23 at a predetermined timing.

The following is a description of the operation of the coil spring manufacturing device 10.

The material. W1 of the coil spring W is passed through the stressing mechanism 40 and directed to the mandrel 11. The temperature of the material W is not higher than the cold- or warm-forming temperature, that is, the $A_1$-transformation temperature of the spring steel. The temperature not higher than the $A_1$-transformation temperature is a material temperature at which spring-back occurs. The distal end portion W2 of the material W1 is inserted between the mandrel 11 and chuck 30. If a starting signal is delivered to the controller 60, the cylinder mechanism 31 is activated, whereupon the distal end portion W2 of the material W1 is clamped by the chuck 30.

Then, the clutch 23 is activated so that the power of the motor 24 is transmitted to the mandrel driver head 20 through the reduction gear mechanism 21, whereupon the mandrel 11 rotates in the direction of arrow R1. The rotational angle of the mandrel driver head 20 is detected by the first detector 25. A detected signal is input to the controller 60. The controller 60 is previously loaded with data on the pitch angle of the coil spring W and data on the torsional and tensile loads for the stressing mechanism 40 by a predetermined method (e.g., keyboard input, recording medium, etc.). As the stressing mechanism 40 is controlled based on these data, the material W1 is subjected to bending deformation, and at the same time, torsional torque and a tensile load are applied to the material W1. Further, the servomotor 45 produces rotation such that the stressing mechanism 40 moves in the direction of arrow X2, whereupon the pitch of the coil spring W is formed corresponding to the rotational angle of the mandrel 11.

When the material W1 finishes being wound on the mandrel 11, a signal is delivered to the clutch/brake drive unit 61 by the controller 60, whereupon the mandrel 11 ceases to rotate. Further, the servomotor 45 performs a return operation such that the stressing mechanism 40 returns to its original position. At the same time, the cylinder mechanism 18 is powered so that the mandrel holder 15 moves to the right in FIG. 1. Thereupon, the coil spring W is allowed to be disengaged from the mandrel 11. After the coil spring W is disengaged, the mandrel 11 is moved again along the axis X by the cylinder mechanism 18, whereupon the end portion 11b of the mandrel 11 is fitted into the mandrel driver head 20.

In plastically working (or coiling) the coil spring W, a stressing process is performed together with bending. In the stressing process, the stressing mechanism 40 applies a tensile and/or torsional load to the coil spring W. By means of this load, residual stresses different from those obtained when normal deformation is applied can be produced on the outside and inside of the bend of the coil spring W after an unloading process. The following is a description of residual stress produced in the coil spring W by the stressing mechanism 40.

In each of FIGS. 2 to 8, the abscissa represents the position of a radial cross-section of the material. If the cross-section of the material is perfectly circular, the center of the abscissa is the center of the cross-section, that is, the center of the material. Although the cross-section of the material is regarded as perfectly circular in the description to follow, the same applies to the case where the cross-section has a shape (e.g., an ellipse or oval) other than the shape of a perfect circle.

In FIGS. 2 to 8, the ordinate represents principal stresses. Based on customary studies of the material mechanics, the positive (+) and negative (−) principal stresses are assumed to be tensile and compressive, respectively. In the description to follow, the left side of the abscissa in each of FIGS. 2 to 8 is regarded as the outside of the bend, and the right side as the inside.

Full line A in each of FIGS. 2 to 8 represents a stress distribution obtained when bending deformation is applied. Diagonal straight line B represents the degree of unbending for minimum internal elastic energy reached when the load caused by bending is removed. Thus, the difference between the stress (full line A) caused by bending and the level of straight line B remains as the residual stress in the formed coil spring. Dash-dotted line C in each of FIGS. 2 to 8 represents the residual stress. Upper and lower chain lines D1 and D2 in each of FIGS. 2 to 8 represent yield stresses. The stress in the material never exceeds this value without regard to the timing of the bending deformation.

Figure 2:
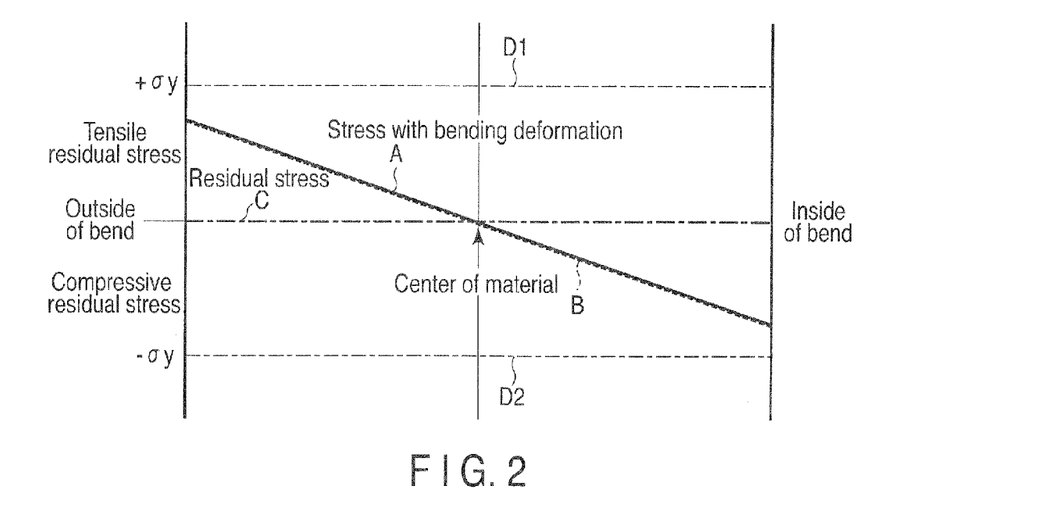
FIG. 2 is a diagram showing stress caused when bending deformation is applied in an elastic region of a material and residual stress.

FIG. 2 shows stress distributions obtained during bending and unbending operations in an elastic region. The stress caused when bending deformation is applied is lower than the yield stresses D1 and D2. Accordingly, the stress distribution A obtained when bending deformation is applied is depicted by a straight line, which is coincident with straight line B to be returned after unloading. Thus, the residual stress C after unloading is zero.

Figure 3:
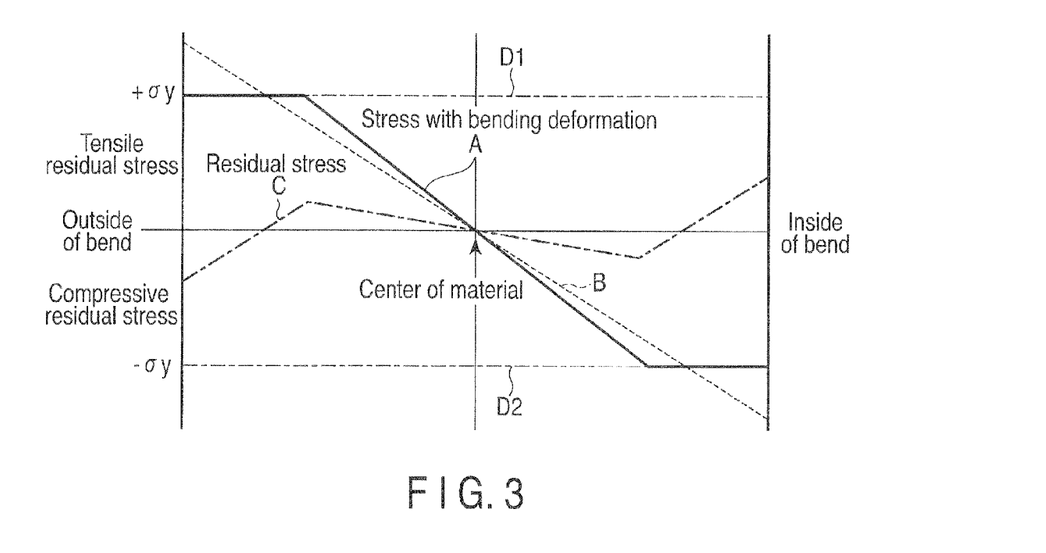
FIG. 3 is a diagram showing stress caused when bending deformation beyond the elastic region is applied to the material and residual stress.

The same consideration can be applied to a case involving plastic working. In this case, however, the outside and inside of the bend are partially in a plastic region, so that the original state cannot be completely restored even after the bending load is removed. FIG. 3 shows a stress distribution for this case. Although spring-back occurs such that the elastic energy is minimized after unloading, elastic strain remains because of the internal stress distribution. This generates residual stress. As shown in FIG. 3, "compressive residual stress" remains near the surface on the outside of the bend, and "tensile residual stress" remains near the surface on the inside of the bend.

Figure 4:
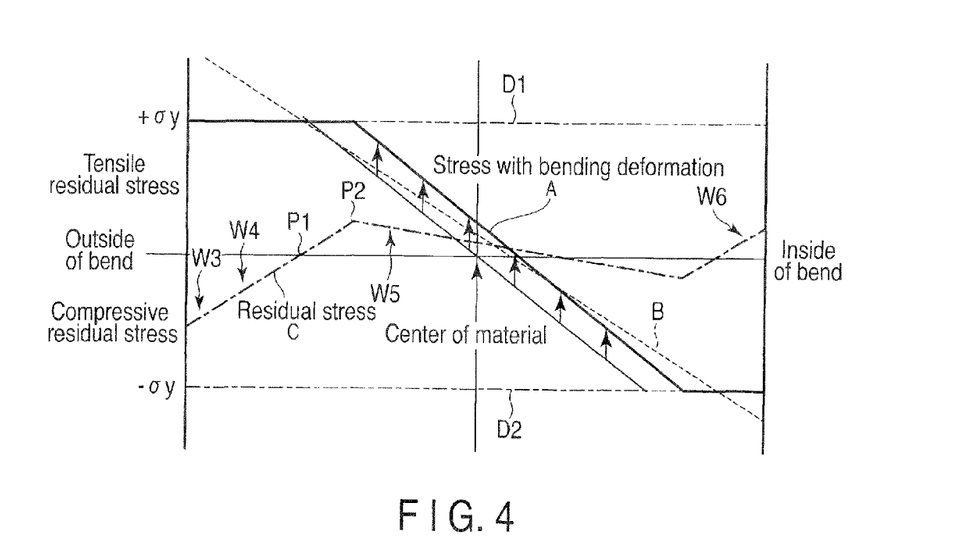
FIG. 4 is a diagram showing stress caused when bending deformation beyond the elastic region and a tensile load are applied to the material and residual stress.

An interesting phenomenon occurs if a tensile load is applied for working in the stressing process at the same time with bending deformation exceeding the yield stresses. FIG. 4 shows a stress distribution for this case. As shown in FIG. 4, the bending stress distribution A shifts upward when a tensile load is applied. Since the stress reaches its peak at the value of the yield stresses D1 and D2, however, the balance between the plastic regions on the outside and inside of the bend changes.

The unloading process is performed by disengaging the material W1 from the mandrel 11 after the stressing process is performed. FIG. 4 shows the residual stress C caused after the loads (bending and tensile loads) are removed in the unloading process. In the stress distribution shown in FIG. 4, compared with the stress distribution of FIG. 3, the compressive residual stress (absolute value) on the outside of the bend is higher, and the tensile residual stress (absolute value) on the inside of the bend is lower. This is a very desirable feature in improving the durability of the formed coil spring.

The compression coil spring having the residual stress C shown in FIG. 4 comprises an outside surface region W3, compressive stress reduction region W4, stress change portion P1, tensile stress peak portion P2, tensile stress reduction region W5, and inside surface region W6. The outside surface region W3 comprises a surface on the outside of the bend of the coil spring and has compressive residual stress. In the compressive stress reduction region W4, the compressive residual stress is reduced from the outside surface region W3 toward the center of the material. The stress change portion P1 exists between the outside surface region W3 and the center of the material and involves a change from the compressive residual stress to the tensile residual stress. The tensile stress peak portion. P2 exists between the stress change portion P1 and the center of the material and involves the maximum tensile residual stress. In the tensile stress reduction region W5, the tensile residual stress is reduced from the tensile stress peak portion P2 toward the inside of the bend of the coil spring. The inside surface region W6 comprises a surface on the inside of the bend of the coil spring and has tensile residual stress with an absolute value smaller than that of the compressive residual stress of the outside surface region W3.

Thus, in the coil spring having the stress distribution shown in FIG. 4, the compressive residual stress remains on the surface outside the bend, and the compressive residual stress is reduced from the surface on the outside of the bend toward the center of the material. The stress change portion P1 at which the change from the compressive residual stress to the tensile residual stress occurs exists between the surface on the outside of the bend and the center of the material. The tensile stress peak portion P2 at which the tensile residual stress is maximum exists between the stress change portion P1 and the center of the material. The tensile residual stress is reduced from the tensile stress peak portion P2 toward the inside of the bend. The tensile residual stress the absolute value of which is smaller than that of the compressive residual stress on the surface outside the bend remains on the surface inside the bend. Thus, the durability of the coil spring was capable of being improved by simultaneously applying the bending deformation and tensile load to the coil spring.

Figure 5:
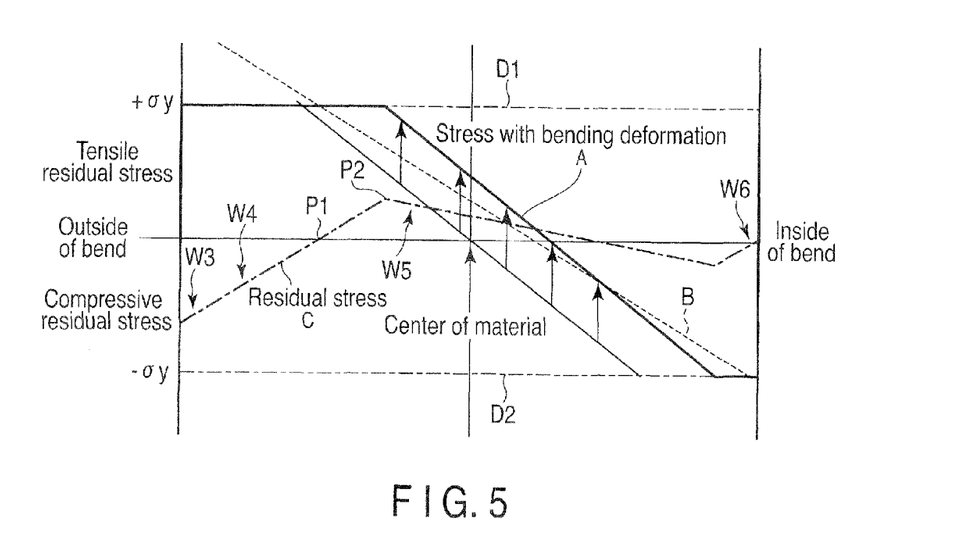
FIG. 5 is a diagram showing stress caused when a tensile load greater than that shown in FIG. 4 is applied to the material and residual stress.
Figure 6:
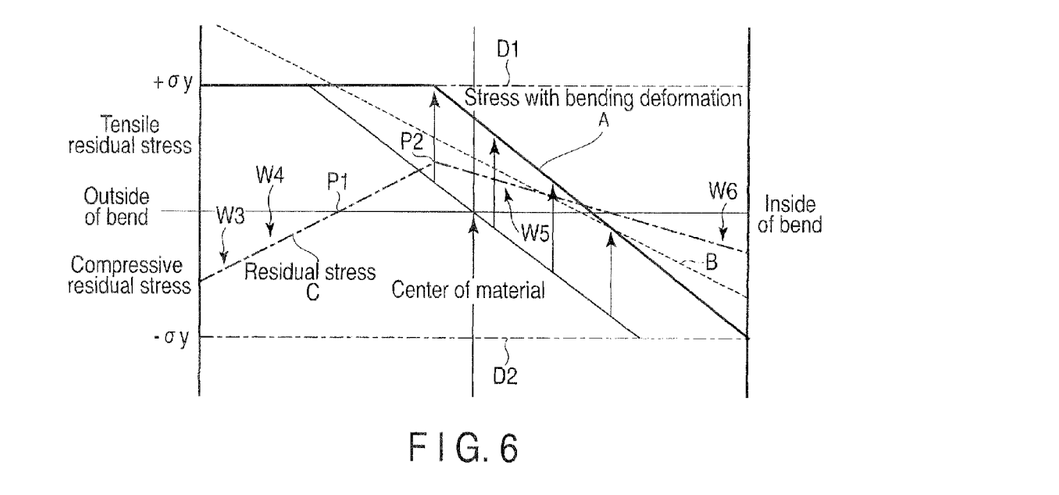
FIG. 6 is diagram showing stress caused when a tensile load further greater than that shown in FIG. 5 is applied to the material and residual stress.

To further enhance this effect, the tensile load that is applied simultaneously with the bending deformation should only be increased in the stressing process. If the tensile load is increased, the compressive residual stress (absolute value) on the outside of the bend is further increased, while the tensile residual stress (absolute value) on the inside of the bend is further reduced, as shown in FIG. 5. If the tensile load is further increased, the residual stress on the inside of the bend of the coil spring after the unloading process also becomes compressive residual stress, as shown in FIG. 6. Thus, the durability of the coil spring can be improved even if shot peening is reduced or omitted.

Figure 7:
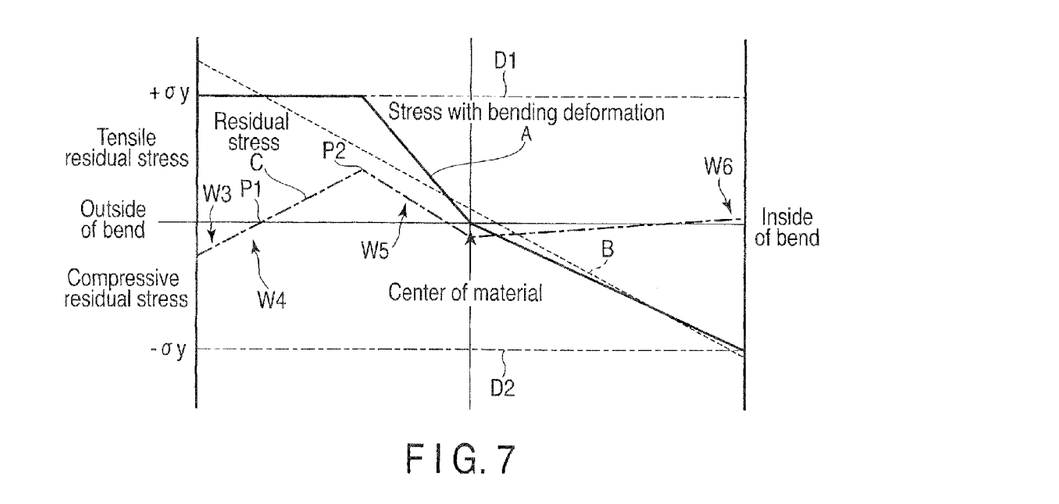
FIG. 7 is a diagram showing stress caused when bending deformation beyond the elastic region and a torsional load are applied to the material and residual stress.

Stress due to a twist increases in proportion to the distance from the center of the twist. In the above-described example of the coil spring, stress is produced in proportion to the distance from the center of the material. FIG. 7 shows an example of a case where stress due to a bend is added to this twisted state. If an appropriate torsional load (torque) is selected by the stressing mechanism 40 of the coil spring manufacturing device 10, the tensile residual stress on the inside of the bend of the coil spring after the unloading process can be made sufficiently low.

The compression coil spring having the residual stress C shown in FIG. 7 also comprises an outside surface region W3, compressive stress reduction region W4, stress change portion P1, tensile stress peak portion P2, tensile stress reduction region W5, and inside surface region W6. The outside surface region W3 comprises a surface on the outside of the bend of the coil spring and has compressive residual stress. In the compressive stress reduction region W4, the compressive residual stress is reduced from the outside surface region W3 toward the center of the material. The stress change portion P1 exists between the outside surface region W3 and the center of the material and involves a change from the compressive residual stress to the tensile residual stress. The tensile stress peak portion P2 exists between the stress change portion P1 and the center of the material and involves the maximum tensile residual stress. In the tensile stress reduction region W5, the tensile residual stress is reduced from the tensile stress peak portion P2 toward the inside of the bend of the coil spring. The inside surface region W6 comprises a surface on the inside of the bend of the coil spring and has tensile residual stress with an absolute value smaller than that of the compressive residual stress of the outside surface region W3.

Thus, in the coil spring having the stress distribution shown in FIG. 7, the compressive residual stress remains on the surface outside the bend, and the compressive residual stress is reduced from the surface on the outside of the bend toward the center of the material. The stress change portion P1 at which the change from the compressive residual stress to the tensile residual stress occurs exists between the surface on the outside of the bend and the center of the material. The tensile stress peak portion P2 at which the tensile residual stress is maximum exists between the stress change portion P1 and the center of the material. The tensile residual stress is reduced from the tensile stress peak portion P2 toward the center of the material. The compressive residual stress remains in the center of the material. The tensile residual stress the absolute value of which is smaller than that of the compressive residual stress on the surface outside the bend remains on the surface inside the bend. This coil spring was also capable of exhibiting excellent durability.

Figure 8:
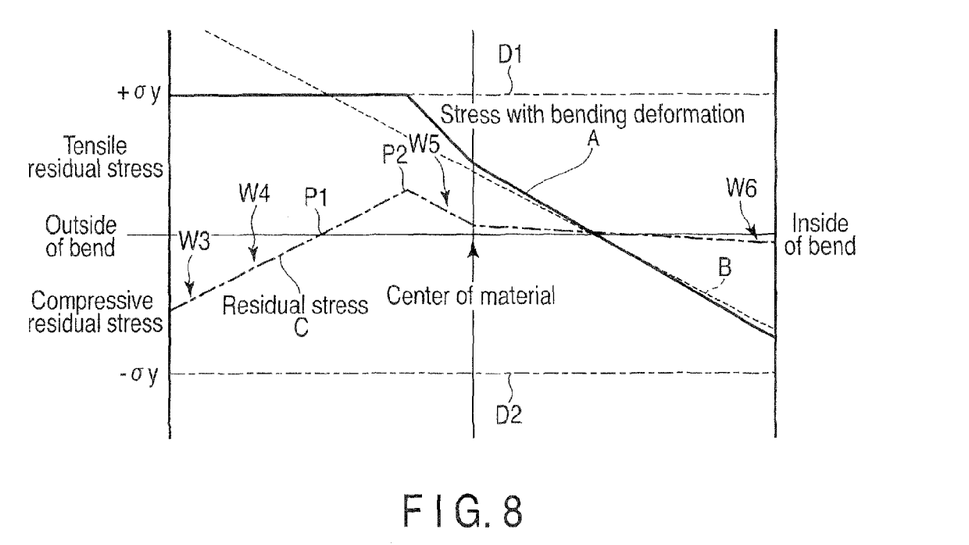
FIG. 8 is a diagram showing stress caused when bending deformation beyond the elastic region and tensile and torsional loads are applied to the material and residual stress.

In the stressing process, the same effect as described above can be expected even if tensile and torsional loads are applied simultaneously with the bending deformation. FIG. 8 shows an example of stress for this case.

The coil spring having the stress distribution shown in FIG. 8 also comprises an outside surface region W3, compressive stress reduction region W4, stress change portion P1, tensile stress peak portion P2, tensile stress reduction region W5, and inside surface region W6. The outside surface region W3 comprises a surface on the outside of the bend of the coil spring and has compressive residual stress. In the compressive stress reduction region W4, the compressive residual stress is reduced from the outside surface region W3 toward the center of the material. The stress change portion P1 exists between the outside surface region W3 and the center of the material and involves a change from the compressive residual stress to the tensile residual stress. The tensile stress peak portion P2 exists between the stress change portion P1 and the center of the material and involves the maximum tensile residual stress. In the tensile stress reduction region W5, the tensile residual stress is reduced from the tensile stress peak portion P2 toward the inside of the bend of the coil spring. The inside surface region W6 comprises a surface on the inside of the bend of the coil spring and has compressive residual stress with an absolute value smaller than that of the compressive residual stress of the outside surface region W3.

Thus, in the compression coil spring having the stress distribution shown in FIG. 8, tensile and torsional loads are applied simultaneously with bending in the stressing process. Further, the compressive residual stress remains on the surface outside the bend after the performance of the unloading stress. In this coil spring, the compressive residual stress is reduced from the surface outside the bend toward the center of the material, and the stress change portion P1 at which the change from the compressive residual stress to the tensile residual stress occurs exists between the surface outside the bend and the center of the material. The tensile stress peak portion P2 at which the tensile residual stress is maximum exists between the stress change portion P1 and the center of the material. The tensile residual stress is reduced from the tensile stress peak portion P2 toward the inside of the bend. The compressive residual stress remains on the surface inside the bend. The durability of the coil spring was also capable of being improved in this case.

The present invention is applicable to compression coil springs for various devices other than vehicle suspension springs. It is to be understood, in carrying out the present invention, that the specific forms of the coil spring manufacturing device and manufacturing method, including the mandrel and stressing mechanism, as well as the shapes of the compression coil spring, may be variously modified without departing from the spirit of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. A compression coil spring formed by spirally bending a rod-shaped spring material, comprising:
- an outside surface region comprising a surface on an outside of a bend of the coil spring and having a compressive residual stress;
- a compressive stress reduction region in which the compressive residual stress is reduced from the outside surface region toward a center of the material;
- a first stress change portion which exists between the outside surface region and the center of the material and at which a change from the compressive residual stress to a tensile residual stress occurs;
- a tensile stress peak portion which exists between the first stress change portion and the center of the material and at which the tensile residual stress is maximum;
- a tensile stress reduction region in which the tensile residual stress is reduced from the tensile stress peak portion toward an inside of the bend of the coil spring;
- an inside surface region comprising a surface on the inside of the bend and having a tensile residual stress or a compressive residual stress with an absolute value smaller than an absolute value of the compressive residual stress of the outside surface region; and
- a second stress change portion which exists between the tensile stress peak portion and the inside surface region and at which a change from the tensile residual stress to the compressive residual stress occurs;
- wherein the outside surface region, the compressive stress reduction region, the first stress change portion, the tensile stress peak portion, the tensile stress reduction region, the second stress change portion, and the inside surface region are formed in this order from the outside of the bend toward the inside of the bend.

* * * * *